(No Model.)
A. D. & B. F. GILPIN.
STALK OR WEED CHOPPER.
No. 370,616. Patented Sept. 27, 1887.
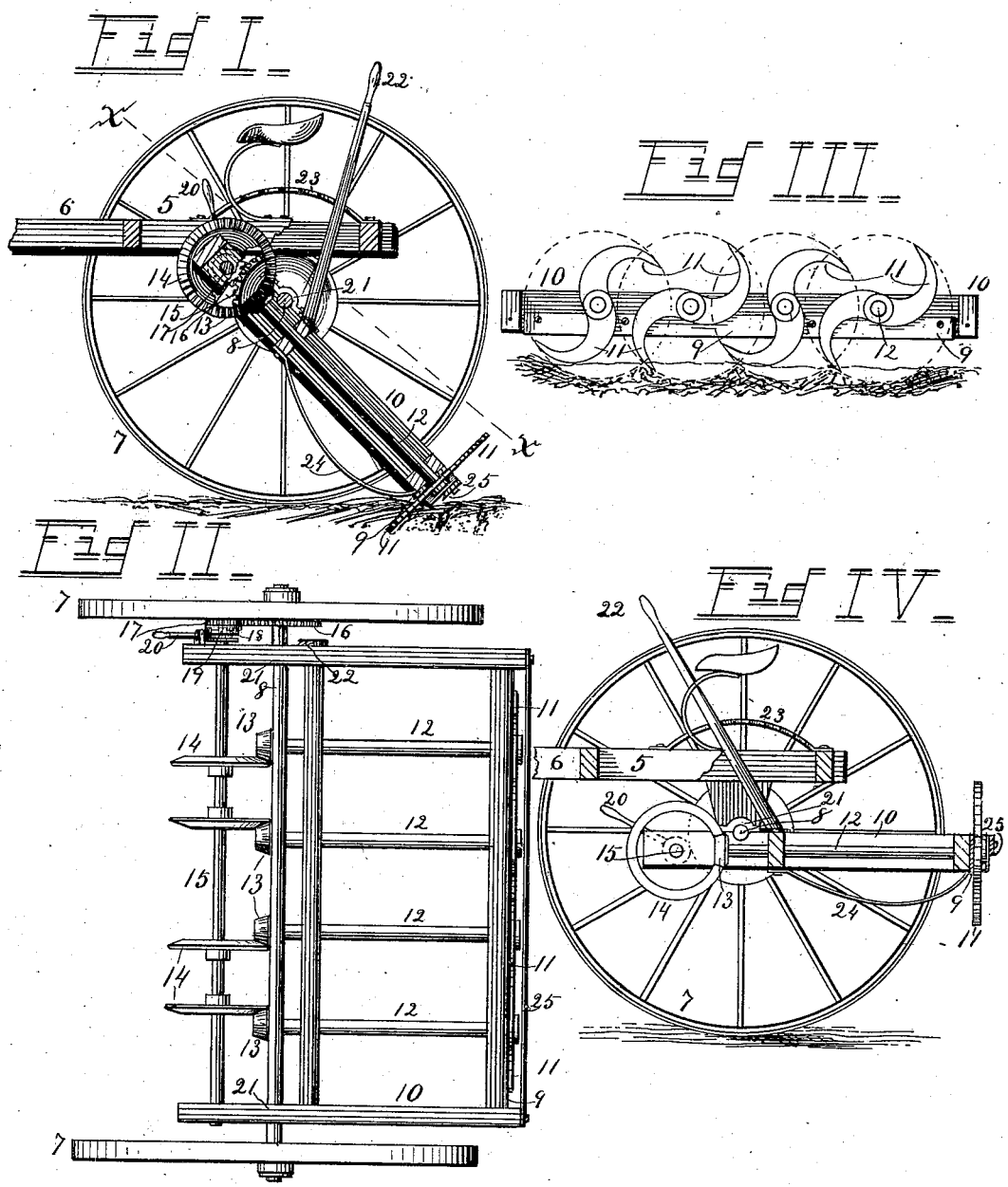
Witnesses
S. E. E. Stevens
P. E. Stevens
Inventor
Albert D. Gilpin.
Benjamin F. Gilpin.
By their Attorney W. X. Stevens.

UNITED STATES PATENT OFFICE.

ALBERT D. GILPIN AND BENJAMIN F. GILPIN, OF LINCOLN, KANSAS.

STALK OR WEED CHOPPER.

SPECIFICATION forming part of Letters Patent No. 370,616, dated September 27, 1887.

Application filed July 6, 1887. Serial No. 243,491. (No model.)

*To all whom it may concern:*

Be it known that we, ALBERT D. GILPIN and BENJAMIN F. GILPIN, citizens of the United States, residing at Lincoln, in the county of Lincoln and State of Kansas, have invented certain new and useful Improvements in Stalk or Weed Choppers; and we do declare the following to be a full, clear, and exact description of the invention, such as will enable others skilled in the art to which it appertains to make and use the same.

This invention relates to that class of stalk or weed choppers which are mounted on wheels and drawn across the field to chop the old cornstalks, cotton-stalks, weeds, &c., into pieces so fine as not to interfere with subsequent tillage of the soil; and the objects of the invention are, first, to so locate a stationary blade that stalks when lifted in a horizontal position to the blade will be cut obliquely thereby; second, to provide an apron which shall bend down standing stalks to a horizontal position beneath the blade; third, to so arrange a series of revolving hooks that they shall dig into the earth and rake transversely the whole breadth of the machine's path, and lift all the stalks in the said path repeatedly to the stationary blades, acting in conjunction therewith, as shears, to cut each and all the stalks into short pieces; and, fourth, to so arrange two fixed blades relatively to each other and to the revolving hooks as to aid in presenting the cutting-edges obliquely to the stalks, &c. We attain these objects by means of the mechanism illustrated in the accompanying drawings, in which—

Figure 1 is a longitudinal vertical section of a portion of stalk or weed chopping machine, showing our invention in position for service. Fig. 2 is a plan view of the same on the line X, with the carriage-frame removed. Fig. 3 is a rear view of the hooks and the inner shear-blade, the outer blade being removed; and Fig. 4 is a vertical section similar to Fig. 1, except that the cutting-gear is raised out of service and in position for traveling.

5 is the carriage-frame, provided with the usual tongue, 6, and mounted on wheels 7 by means of an axle, 8, which is fitted to revolve in both the wheels and in the frame. The axle is engaged with the wheels by means of any usual device—such as pawls and ratchet-wheels—which cause the axle to revolve only when the wheels travel forward to prevent the shears from being run backward. This is common to similar machines.

9 is the principal cutting-blade, and it is fixed to a frame, 10, across the line of the machine, inclined at an angle of about forty-five degrees, with its edge down and forward to meet the stalks at a slant when they are lifted to it. For this purpose we provide a series of hooked arms, 11, fixed in pairs upon shafts 12, which are longitudinally journaled in bearings in the frame 10, and provided at their forward ends with beveled gear-wheels 13, to engage a series of larger beveled gears, 14, that are fixed upon a horizontal transverse shaft, 15, which is also journaled in the frame 10.

16 is a spur-wheel fixed upon the axle 8 to revolve therewith, and 17 is a pinion journaled to revolve freely on the shaft 15, and is provided with lugs or clutch-teeth 18.

19 is a clutch splined upon the shaft 15 to revolve it, but free to slide endwise on it to be engaged with the teeth 18, or to be disengaged therefrom by means of a hand-lever, 20. When the clutch is engaged, motion is transmitted through it from the wheels 7 to the hooks 11, causing them to dig into the ground and lift all the stalks or weeds which may be in their path with quick strokes up to the fixed blade 9, and thereby to cut the stalks repeatedly as the hooks in succession catch the stalks. The cutter-frame 10 is hung in journals 21 upon the axle 8, and is provided with a lever, 22, whereby the driver may raise or depress its rear end, and by means of the toothed segment 23 he may fix the lever to hold the cutter-frame at any required angle, either to force the hooks to dig more or less into the earth, or to carry them freely above the earth, as in Fig. 4.

24 is an apron, of sheet metal or other suitable material, fixed to the frame 10 forward of and above the blade 9, and slanting in a curve thereto to bear down and guide to the reach of the hooks any stalks which are standing.

25 is another blade similar to blade 9 and fixed parallel therewith, but on the opposite side of the hooks. Relative to the plane of revolution of the hooks the edges of the blades lie in a plane forming an angle of about forty-five degrees therewith. If a loose stalk be hooked up, it first meets the forward blade, and, being pried over that, it will be brought in contact with the rear blade. The hook being between the two blades, the stalk will now be cut off by both blades, and the cutting is made easy by the slant of the blades to the stalk. The edge of the rear blade is much nearer to the axis of revolution of the hooks than is the edge of the forward blade, and when at work the two edges are intended to be in a plane parallel with the ground.

The shafts 12 are geared to revolve, one to the right and the next to the left, so that adjacent hooks may be placed close enough together to dig the whole width of the path, and the arms of the hooks alternate with each other like the teeth of the gear-wheels, though without touching. The machine is designed to straddle a row of old stalks, the center two hooks doing the main part of the work, lift the stalks up between them and alternately cut upon the same portion of the blades, while the side hooks both revolve to carry the scattering stalks outward and cut them near the ends of the knives. The hooks may or may not be sharpened as cutting-blades, the main dependence for cutting being placed on the fixed blades 9 and 25, which are straight, so that they may be readily ground, and they are attached to the machine with screws to be readily removed for that purpose. They all revolve in one plane and bear against the rear face of the blade 9, to which the blade is sharpened as the cutting-edge.

This machine is simple, direct acting, easy of operation, light of draft, and efficient for all the purposes of chopping into small pieces old cornstalks and weeds, or refuse stalks of any character, by the act of passing over the same upon the field, thus removing the said refuse as an obstruction to future tillage, and yet retaining the same upon the field as a fertilizer.

Having thus fully described our invention, what we wish to secure by Letter Patent is the following:

1. The combination, in a stalk-chopper, of a wheeled carriage, a blade carried transversely thereon, with its plane slanting forward to an edge, a shaft journaled longitudinally of the frame in a slanting position and provided with hook-shaped arms fitted to revolve in a plane parallel with the plane of the said blade, and means, substantially as shown and described, for laying the stalks in a horizontal position beneath the said blade by the advance of the machine, whereby the blade is advanced upon the stalks with its plane slanting to them, as set forth.

2. The combination, in a stalk-chopper, of a revolving shaft, hook-shaped arms thereon arranged to revolve in a plane slanting to the ground, and two blades fixed with their edges in the same direction, their planes being nearly parallel with the plane of revolution of the said arms and at opposite sides thereof, and the edge of one blade materially nearer to the line of the axis of revolution of the said shaft than the edge of the other blade is, substantially as shown and described.

3. The combination, in a stalk-chopper, of a wheeled carriage, hook-shaped arms journaled thereon to revolve in a plane transverse to the path and slanting to the ground, and two blades fixed with their planes nearly parallel with the plane of revolution of the said arms and at opposite sides thereof, the edges of said blades being downward and in a plane nearly parallel with the ground, substantially as shown and described.

4. The combination, in a stalk-chopper, of a wheeled carriage, two or more shafts journaled therein and provided with arms fitted to revolve in one plane, a blade fixed close to and parallel with that plane, and gearing whereby the arms of adjacent shafts are moved alternately through the same space without coming in contact with each other, substantially as shown and described.

5. The combination, in a stalk-chopper, of a wheeled carriage, a frame hung rearward from the axle thereof, a cutting-blade fixed across the rear end of the said hanging frame, with its edge downward and slanting forward, hooks journaled to revolve as shear-blades in connection with the said fixed blade, and an apron secured to the said hanging frame above and forward of the said fixed blade and slanting rearward to the horizontal plane of the fixed blade-edge, substantially as shown and described, whereby the stalks are first laid in a horizontal position beneath the blade and afterward raised to the blade at a sharp inclination therewith.

In testimony whereof we affix our signatures in presence of two witnesses.

ALBERT D. GILPIN.
BENJAMIN F. GILPIN.

Witnesses:
T. M. W. WALTON,
C. B. CHENEY.